United States Patent

[11] 3,632,457

| [72] | Inventor | Jerrold M. Alyea<br>Alton, Madison, Ill. |
|---|---|---|
| [21] | Appl. No. | 749,611 |
| [22] | Filed | Aug. 2, 1968 |
| [45] | Patented | Jan. 4, 1972 |
| [73] | Assignee | Olin Corporation |

[54] STRAND-ANNEALING COMPOSITE METALS
2 Claims, No Drawings

[52] U.S. Cl. .................................................. 148/127,
29/196.2, 29/196.3, 148/34
[51] Int. Cl. .................................................. C21d 1/26,
B22b 15/18, B22b 15/20
[50] Field of Search .......................................... 148/127,
34, 12; 29/196.2, 196.3

[56] References Cited
UNITED STATES PATENTS

| 2,220,652 | 11/1940 | Irmann | 29/1.3 |
|---|---|---|---|
| 2,388,694 | 11/1945 | Keene et al. | 148/12 |
| 2,417,760 | 3/1947 | Keene | 148/127 |
| 2,818,360 | 12/1957 | Porter | 29/196.2 X |
| 3,093,459 | 6/1963 | Siebel et al. | 148/34 |
| 3,400,450 | 9/1968 | Nock, Jr. et al. | 29/196.2 X |
| 3,463,620 | 8/1969 | Winter | 29/196.2 X |
| 3,496,621 | 2/1970 | Winter | 29/196.2 X |

OTHER REFERENCES
Metals Handbook, 8th Edition, Volume 1, 1961, page 966.

*Primary Examiner*—L. Dewayne Rutledge
*Assistant Examiner*—G. K. White
*Attorneys*—Robert H. Bachman, Henry W. Cummings, Richard S. Strickler, Donald R. Motsko and Thomas O'Day

ABSTRACT: A process for obtaining an integral composite metal article having a suitable grain size for mechanical deformation by strand annealing a cold-worked composite metal article having a plurality of dissimilar metal members integrally bonded together, and the article produced thereby.

STRAND-ANNEALING COMPOSITE METALS

The present invention relates to composite metal articles. In particular the present invention resides in a method of annealing composite metal article without degrading the bond between the members of these articles or causing excessive grain growth in one or more of the members, and the composite metal articles produced thereby.

Composite articles comprising dissimilar metal members are highly desireable commercially due to the fact that the beneficial characteristics of, for example, the core and the cladding materials, may be obtained in one integral composite metal article. In a single alloy frequently many properties cannot be greatly modified by alloying or thermal treatments, for example, such properties as modulus of elasticity, color, density, and strength in combination with high thermal or electrical conductivity. However, by forming composites, apparent properties of the cladding can be generated while retaining the bulk properties of the core material. In this manner one can often obtain greatly modified and highly desirable properties over the single alloy.

For example, an iron base alloy has the advantage of high strength and cold formability. By forming iron composites one can retain these desirable properties while generating properties of the cladding, such as wear resistance, color, oxidation, conductivity, or tarnish resistance and fine finishing, i.e., surface quality.

Various uses to which the aforementioned composite article may be are as follows: heat exchangers, electrical hardware, builders hardware, utensils, automotive components, shipping containers, and ornamental purposes.

However, during annealing of the composite strip, at any time after bonding, excessive grain growth as a function of time and temperature may occur in the member having the lowest temperature of recrystallization or softening point, since the annealing temperature required is that necessary to effect recrystallization in that member comprising the metal or alloy having the highest softening or recrystallization point. Thus, excessive grain growth may occur in the lower softening point alloy, depending upon the relative softening points of the dissimilar alloy members. Thereupon, an unsuitable surface for commercial applications may result during subsequent mechanical working such as, drawing or other forming operations.

Furthermore, due to the length of time in which the composite article is at a temperature substantially above the recrystallization temperature of the lower softening point alloy member, intermetallic compounds may form as for example with an iron base alloy and an aluminum base alloy and thereby weaken or destroy the interfacial bond between the members.

It is therefore, a principal object of the present invention to provide a new and improved process for annealing composite metal articles.

It is a further object of the present invention to provide a method as aforesaid whereby the method is simple, expeditious, and convenient to use.

It is a still further object of the present invention to provide a process as aforesaid which overcomes the numerous limitations and disadvantages attendant upon the formation of conventional composite articles having dissimilar alloy components or members.

In accordance with the present invention, it has now been found that the foregoing objects may be readily attained. The process of the present invention, especially useful wherein a relatively high softening point iron base alloy is employed as one or more members of the composite, readily overcomes the disadvantages of the art and achieves a simple and convenient process for obtaining a highly useful integral composite metal article.

The process of the present invention comprises (a) providing a cold-worked integral metal composite article and (b) strand annealing said composite at a speed of from 5 to 200 feet per minute.

Preferably, but not necessarily, the aforementioned members of the composite should be bonded together in accordance with the methods of U.S. Pat. Nos. 3,381,364, 3,381,365, 3,381,366, which teach convenient methods for preparing composite metal articles. For example, U.S. Pat. No. 3,381,365 teaches a method for preparing an iron base alloy core composite. It is difficult to provide a composite metal article having an iron base core due to the formation of both adherent and flaky oxides at moderate or elevated temperatures necessary for hot rolling. This oxide layer frequently tends to break open during hot rolling but still can and often does cause severe problems. In addition a layer of brittle intermetallic compounds tends to form in the interface of an iron base alloy core and the cladding when the cladding is an aluminum base alloy.

Briefly, the process described in the aforementioned application provides for heating the iron base core, said core of a thickness of less than 0.50 inch, to a temperature between 300°–1,350° F. rolling together said core and cladding at a speed of at least 50–150 feed per minute in one pass at a reduction range between 35 to 75 percent with said core and cladding coming together for the first time in the bite of the rolls, said cladding of a thickness less than 0.25 inch, and contacting the roll prior to contacting the iron base core. It is necessary that the included angle between the core and the cladding members is in excess of 5° upon entering the roll, with the preferred angle in excess of 10°. An angle in excess of 10° will insure that the cladding members in the core do not come together earlier than in the bite of the rolls.

Upon entering the rolls, the cladding and the rolls are traveling at different linear speeds whereas upon exiting from the rolls they are going at the same speed due to reduction in the thickness of the composite. The difference in traveling speeds between the rolls and the cladding in combination with the precontacting of the cladding and the rolls generates shear strain and introduces shearing in the bite of the rolls and the core-cladding interface. The shearing strain in this interface results in turbulent material flow thereby causing more intimate bonding by increasing interfacial linear surface of the composite by at least 20 percent. It is further noted that the interfacial surface between the core and the cladding members characterized by the absence of interatomic diffusion between the core and the cladding members.

Naturally, other methods of bonding cladding to an iron base core may also be employed. Thus, the aforementioned limitations as to thickness of the core and the cladding members need not apply.

Typical iron base alloys which may be employed include but are not limited to the following: high-purity iron, alloys of the iron carbon family, iron manganese family, iron-nickel family, and the iron-nickel chromium family, etc.

It is a surprising finding of the present invention that by the use of strand annealing that excessive grain growth in one or more of the composite members may be substantially reduced.

Strand annealing, briefly, provides for relatively high-speed annealing at a temperature substantially above the recrystallization point of the metal or alloy being annealed. The alloy being annealed normally passes through a furnace at a relatively high rate of speed, e.g. between 5 and 200 feet per minute depending upon furnace temperature and the alloy being annealed. Naturally, the time in the furnace is also dependent upon the speed employed but is generally within the range of about 12 seconds to about 8 minutes, although longer periods of time may sometimes be utilized. Normally material in the form of wire or strip, generally from 0.005 to 0.15 inch thick, is annealed by this method due to the necessity of continual feeding of material through the furnace in a single pass. Thus, this method is not suitable for annealing articles in bulk form. The strip or wire is provided in cold-worked form and is automatically passed at a predetermined speed through the furnace and automatically rewound at the exit end.

Thus, due to the relatively high annealing temperature employed in strand annealing, recrystallization will occur in all of the alloy elements of the composite article but due to the shortness of time which the article remains at this temperature, i.e. due to the speed at which the article is passed through the furnace, grain growth of the lower softening point alloy member of the composite is substantially reduced. Thus, due to the smaller grain size obtained by the present invention the metal composite will retain a high-quality surface during subsequent mechanical working of the composite. Thus, the surface quality obtained is more highly suitable for commercial applications. Generally the resultant grain size is in the range of 0.010 to 0.040 mm. in the case of copper base alloys and aluminum base alloys.

Since grain growth is generally restricted in any event by the thickness of a particular alloy component the alloy component in the present invention having the lowest temperature of recrystallization must be at least 0.0015 inch thick.

It is a second surprising finding and advantage of this invention that intermetallic compounds are not formed or are minimized at the interface of the alloy members. This is so since the time at temperature during annealing is short in comparison with the standard annealing practices and thus intermetallic compounds do not have sufficient time for significant formation. Thus, the bond between the various alloy members remains at a high strength and the tendency for the components to loosen during subsequent mechanical operations is substantially decreased.

Naturally, the process of the present invention is readily applicable to metal composites comprising any alloy such as, for example, aluminum base alloys and copper base alloys; it being understood that high-purity aluminum copper is also embraced by these terms.

Naturally, the process of the present invention is also readily applicable wherein the composite article comprises alloy members in addition to a single core and cladding thereon, i.e., to "sandwiching" together successive alloy members.

In addition, the process of the present invention is also applicable wherein varying copper base alloys having a substantial difference in their respective temperatures of recrystallization comprise an integral metal composite; likewise varying aluminum base alloys integrally bonded together, etc.

The present invention will be more readily apparent from a consideration of the following illustrative example.

EXAMPLE

70–30 cartridge brass strip integrally bonded on both sides of SAE 1010 steel strip was processed according to the present invention. The composite comprised a steel core 0.0296-inch thick, with the brass cladding 0.0018-inch thick on one side of the steel core and 0.005-inch thick on the other side. The composite was then strand annealed at a speed of 60 feet/minute and at a furnace temperature 830°. The time in furnace was approximately 1.5 minutes. The resultant grain size of the brass component was found to be 0.03 mm. with a number nine grain in the steel component.

This invention may be embodied in other forms or carried out in other ways without departing from the spirit or essential characteristics thereof. The present embodiment is, therefore, to be considered as in all respects illustrative and not restrictive, the scope of the invention being indicated by the appended claims, and all changes which come within the meaning and range of equivalency are intended to be embraced therein.

What is claimed is:

1. A process for obtaining an integral composite metal article having a suitable grain size for mechanical deformation which comprises:
   A. providing a cold worked composite metal article from 0.005 to 0.125 inch thick comprising an aluminum base alloy integrally bonded to an iron base alloy wherein the aluminum alloy member is at least 0.0015 inch thick and temperature;
   B. recrystallizing strand annealing said cold-worked article for from 12 seconds to 8 minutes at a speed of from 5 to 200 feet per minute at a temperature sufficient to recrystallize said members and to obtain a recrystallized grain size in said aluminum alloy member of from 0.010 to 0.040 mm.

2. A process according to claim 1 wherein said aluminum base alloy is integrally bonded to opposing sides of said iron base alloy.

* * * * *

UNITED STATES PATENT OFFICE
CERTIFICATE OF CORRECTION

Patent No. 3,632,457      Dated January 4, 1972

Inventor(s) Jerrold M. Alyea

It is certified that error appears in the above-identified patent and that said Letters Patent are hereby corrected as shown below:

Column 2, line 7, delete "provide" and insert -- produce --

Column 2, line 20, delete "feed" and insert -- feet --

Column 4, line 29, after "and" insert -- grain growth therein occurs as a function of time and --

Signed and sealed this 30th day of May 1972.

(SEAL)
Attest:

EDWARD M. FLETCHER, JR.
Attesting Officer

ROBERT GOTTSCHALK
Commissioner of Patents